United States Patent
Kusano

(10) Patent No.: US 6,924,829 B2
(45) Date of Patent: Aug. 2, 2005

(54) WEB PROCESSING METHOD AND WEB PROCESSING DEVICE

(75) Inventor: Toru Kusano, Shizuoka-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/445,945

(22) Filed: May 28, 2003

(65) Prior Publication Data

US 2003/0222971 A1 Dec. 4, 2003

(30) Foreign Application Priority Data

May 29, 2002 (JP) ........................................ 2002-155301

(51) Int. Cl.$^7$ .............................................. B41J 2/385
(52) U.S. Cl. ...................................................... 347/157
(58) Field of Search ................................. 347/153, 157, 347/224–225, 239, 255, 262, 264, 227; 358/304; 100/96–97; 400/621, 621.1; 156/387; 219/121.68; 430/502; 83/76.1, 499; 242/545.1

(56) References Cited

U.S. PATENT DOCUMENTS

| | | | |
|---|---|---|---|
| 4,252,044 A | * 2/1981 | Yamashita et al. | 83/499 |
| 4,346,852 A | 8/1982 | Kawada et al. | 242/530.4 |
| 4,398,678 A | 8/1983 | Kron et al. | 242/525.1 |
| 4,544,259 A | 10/1985 | Kanaoka et al. | 355/1 |
| 4,629,139 A | 12/1986 | Sanda et al. | 242/415.1 |
| 4,874,919 A | * 10/1989 | Bransden et al. | 219/121.68 |
| 5,097,732 A | * 3/1992 | Tahara | 83/76.1 |
| 5,099,734 A | 3/1992 | Sugiyama et al. | 83/498 |
| 5,620,151 A | 4/1997 | Ueyama et al. | 242/530 |
| 5,794,500 A | 8/1998 | Long et al. | 88/22 |
| 5,940,115 A | 8/1999 | Nakamura et al. | 347/251 |
| 6,129,810 A | * 10/2000 | Schweitzer et al. | 156/387 |
| 6,130,402 A | 10/2000 | Abella et al. | 219/121.68 |
| 6,236,426 B1 | 5/2001 | Shaffer et al. | 347/241 |
| 6,249,308 B1 | 6/2001 | Shaffer et al. | 347/241 |
| 6,326,590 B1 | 12/2001 | Shaffer et al. | 219/121.84 |
| 6,357,691 B1 | * 3/2002 | Watanabe et al. | 242/545.1 |
| 6,400,389 B1 | 6/2002 | Shaffer et al. | 347/241 |
| 6,464,162 B2 | 10/2002 | Watanabe et al. | 242/545.1 |
| 6,737,228 B2 | * 5/2004 | Elst et al. | 430/502 |

FOREIGN PATENT DOCUMENTS

| | | |
|---|---|---|
| JP | 5-238098 A | 9/1993 |
| JP | 3191201 B2 | 5/2001 |

* cited by examiner

Primary Examiner—Hai Pham
(74) Attorney, Agent, or Firm—Sughrue Mion, PLLC

(57) ABSTRACT

In a web processing device, a marking head is disposed so as to oppose an X-ray film which is trained about a print roller which is at an upstream side of slitting blades. Within a scanning range of a laser beam of a marking head, two printing regions are disposed with a non-printing region therebetween. The non-printing region is disposed so as to oppose a cutting line which is cut by the slitting blades. Before cutting the X-ray film, the web processing device forms marking patterns on both sides of the cutting line.

25 Claims, 6 Drawing Sheets

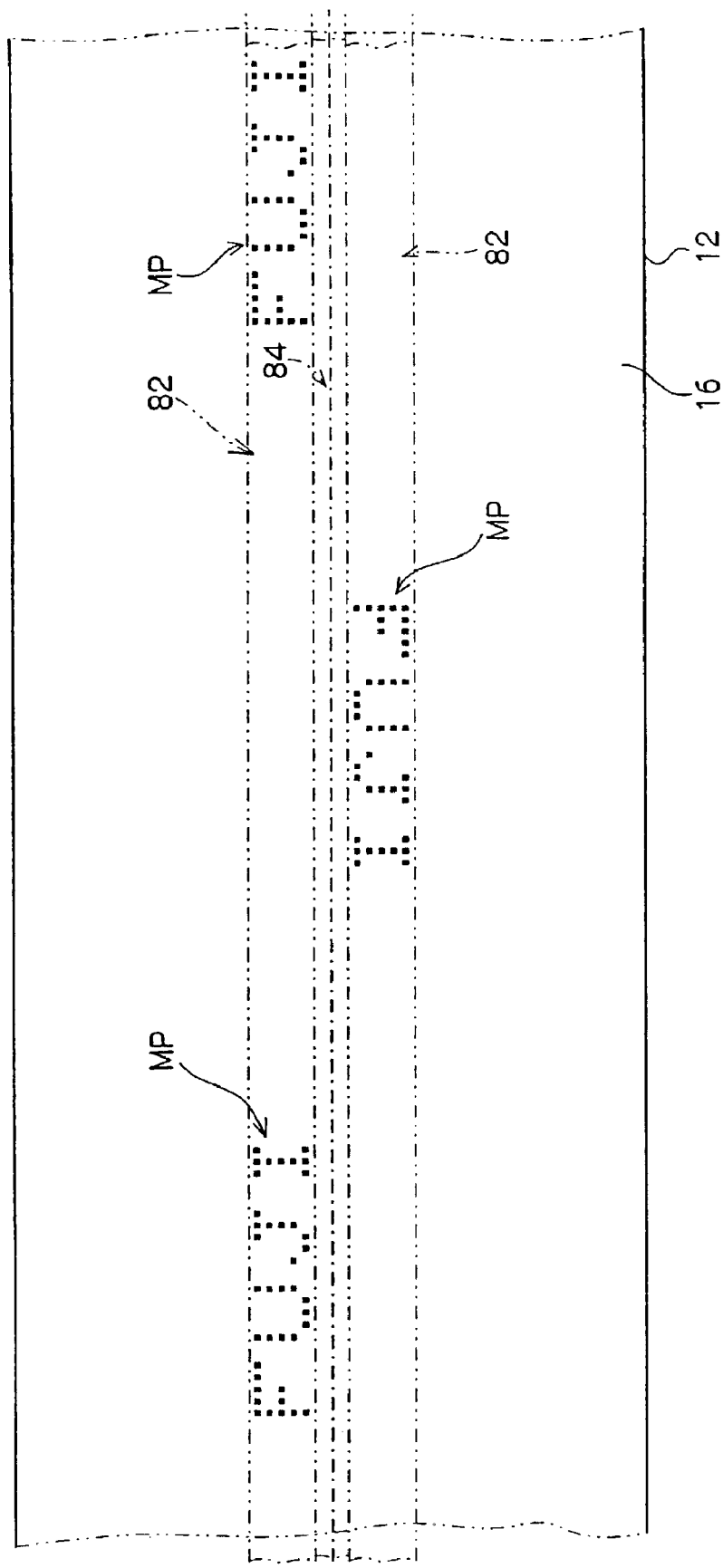

WEB PROCESSING METHOD AND WEB PROCESSING DEVICE

BACKGROUND OF THE INVENTION

1. Technical Field

The present invention relates to a web processing device which cuts a web into predetermined sizes. In particular, the present invention relates to a web processing method and web processing device which form marking patterns, which include visible characters, symbols, or the like, on the web to be cut along a conveying direction thereof.

2. Description of the Related Art

There exists a technique for carrying out marking processing on a web by irradiating a laser beam (laser light) onto the web while continuously conveying the web. Such a technique is proposed in, for example, Japanese Patent Application Laid-Open (JP-A) No. 5-238098.

Various types of conventional techniques have been proposed which are applied to a photosensitive material (such as an X-ray film) which is a web, and which form a marking pattern on the photosensitive material. For example, Japanese Patent No. 3,191,201 proposes setting the laser irradiation time (pulse width) per dot to be at least 30 $\mu$sec or more in order to improve the visibility of a marking pattern formed on a photosensitive material.

A photosensitive material such as an X-ray film is cut into photosensitive materials of small widths from a web roll which is wound in a roll form, and is processed into a final form of sheets or rolls of small widths. Among processing devices used in such processing of X-ray films, there are those in which the X-ray film pulled out from the web roll is, while being conveyed, cut along the conveying direction (which is the longitudinal direction thereof) at a predetermined position along the transverse direction thereof, and each of the cut X-ray films is wound into a roll form.

There are cases in which predetermined characters or symbols (hereinafter called "marking patterns") are formed at positions which are the peripheral edge portions when the X-ray film is formed into sheets for example. After the X-ray films formed in sheet-shapes are stacked up, they are placed at a marking device, and are successively subjected to marking processing while being removed one-by-one, so as to form the marking patterns.

In such a method, the processing of the X-ray film is carried out in two steps: the processing step of carrying out cutting, and the marking step of carrying out the marking processing.

Thus, a method has been thought of in which a marking device is provided at a processing device which cuts a web roll into rolls of small widths or at a processing device which cuts small-width rolls into sheets, and the marking processing is carried out in parallel with the cutting of the web-shaped X-ray film. In this way, the cutting of the X-ray film and the marking are continuous, and can be carried out efficiently.

However, when the X-ray films are sheet-shaped, the conveying speed thereof must be made lower than when the X-ray films are in roll form. Thus, the work efficiency is extremely lowered merely by integrating the cutting process and the marking process.

Further, there are cases in which the laser head, which forms marking patterns on webs such as photosensitive materials by using laser light, has a larger dimension along the transverse direction of the web than the small-width webs do. Therefore, if the laser head is merely provided so as to oppose the respective webs which have been cut to small widths, a larger setting space is needed. This leads to the processing device becoming larger.

Moreover, it is easy for offset in the transverse direction to arise among the webs which have been cut to small widths. Such transverse direction offset of the webs may lead to positional offset of the marking patterns formed on the webs.

SUMMARY OF THE INVENTION

The present invention was developed in consideration of the above circumstances, and an object of the present invention is to provide a web processing method and a web processing device which, while cutting a web such as a photosensitive material into predetermined widths, form marking patterns on the respective cut webs, without leading to an increase in the size of the processing device.

In order to achieve the above object, a first aspect of the present invention is a web processing method. In the web processing method, a web is cut into webs of small widths by being cut by a cutting device at a predetermined position along the transverse direction of the web which is orthogonal to the conveying direction thereof, while the web is being conveyed along the longitudinal direction thereof in a state of being trained about a plurality of rollers. By using a marking mechanism which is provided at the web conveying direction upstream side of the cutting position where the web is cut by the cutting device, characters or symbols are formed on the web by irradiating a laser beam onto the web while scanning the laser beam. After the marking processing has been carried out on a predetermined position of the web, the web is cut by the cutting device.

In accordance with the present invention, the marking processing, which forms marking patterns (which are characters or symbols) on the web, is carried out in parallel with the process of cutting the web. At this time, in the present invention, the marking processing is carried out in a state in which the width of the web is still wide before the web is cut by the cutting device.

In this way, it is possible to improve the work efficiency up to the time of obtaining the small-width webs which are cut and on which the marking patterns are formed. Further, by carrying out the marking processing before cutting the web, it is possible to accurately form the marking patterns at the appropriate positions of the web.

Further, in the web processing method of the present invention, a predetermined position along the transverse direction of the web is used as a non-marking region, and the regions at both transverse direction sides of the non-marking region are used as marking regions. The predetermined marking patterns are formed on the web such that the non-marking region becomes the cutting position of the web which is cut by the cutting device.

In accordance with the present invention, it is possible for the single marking mechanism to form the marking pattern on each of the divisional webs which have been divided by the cutting device. Accordingly, the marking mechanism does not cause the processing device for carrying out processing of the web to become large-sized.

In the present invention, the marking mechanism may form the marking patterns on the web by the laser beam, which is irradiated from a laser oscillator in accordance with the marking pattern, being deflected along the transverse direction of the web by an acoustooptic deflector.

In this way, appropriate marking patterns can be formed on each of the webs by a single marking mechanism.

A second aspect of the present invention is a web processing device to which the above-described method of the first aspect of the present invention can be applied. The processing device basically includes a conveying device, a cutting device, and a marking mechanism. The conveying device conveys the web along the longitudinal direction of the web while training the web around a plurality of rollers. The cutting device cuts the web, which is being conveyed by the conveying device, at a predetermined position in the transverse direction of the web. The marking mechanism is disposed at the upstream side, in the conveying direction of the web, of the cutting device, and forms characters or symbols on the web.

Further, the marking mechanism may carry out marking processing at each of marking regions sandwiching a non-marking region which is an intermediate portion along the transverse direction of the web, and the non-marking region may be disposed so as to become the cutting position of the web which is cut by the cutting device.

The web processing device of the second aspect of the present invention may, in actuality, also include the following devices in addition to the devices having the above-described structures: a base portion at which the slitting blades are provided; a moving device moving the base portion along the transverse direction of the web; a supporting device supporting the marking head; and a connecting device connecting the marking head to the base portion. Due to the supporting device, the marking head can move along the transverse direction of the web. Due to the connecting device, the marking head can move integrally with the slitting blades along the transverse direction of the web.

In accordance with the present invention, the web can be cut to an arbitrary width by moving the slitting blades along the transverse direction of the web by the moving device. Further, due to the marking head being connected to the base portion by the connecting device, the marking head moves integrally with the slitting blades along the transverse direction of the web.

In this way, marking patterns can be formed appropriately at predetermined positions of the web to be cut into several webs, regardless of the widths of the webs.

BRIEF DESCRIPTION OF THE DRAWINGS

FIG. 6 is a schematic diagram of an X-ray film showing another example of marking pattern forming positions.

DETAILED DESCRIPTION OF THE EMBODIMENTS

Embodiments of the present invention will be described hereinafter with reference to the drawings.

Figure 1:
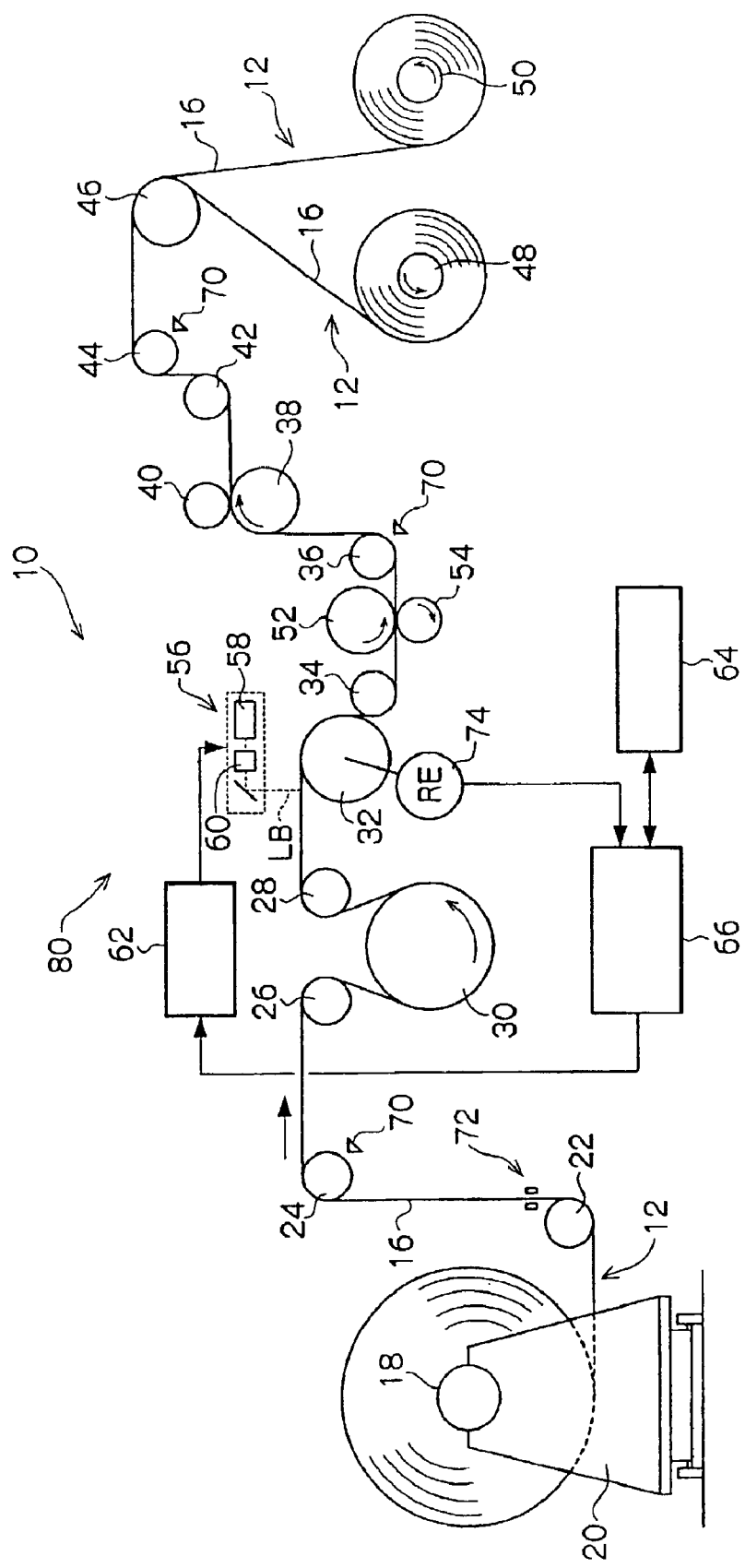
FIG. 1 is a schematic structural diagram of a web processing device applied to an embodiment.

FIG. 1 shows the schematic structure of a web processing device 10 applied to an embodiment of the present invention. The web processing device 10 uses an elongated X-ray film 12 as a web. A web roll, which is formed by the X-ray film 12 being wound up in roll form, is set into the device 10. In the device 10, in the process of conveying the X-ray film 12 while pulling the X-ray film 12 out from the web roll, the film 12 is cut at a predetermined position in the transverse direction which is orthogonal to the conveying direction. The respective cut X-ray films 12 are wound into rolls. Plural rolls of the X-ray film 12, whose widths are smaller than that of the web roll, are thereby formed.

The web processing device 10 may form rolls of X-ray films 12 in their final states. Or, the web processing device 10 may cut the X-ray film 12 at predetermined intervals along the longitudinal direction so as to form intermediate rolls for ultimately forming sheets of the X-ray film 12.

Figure 2:
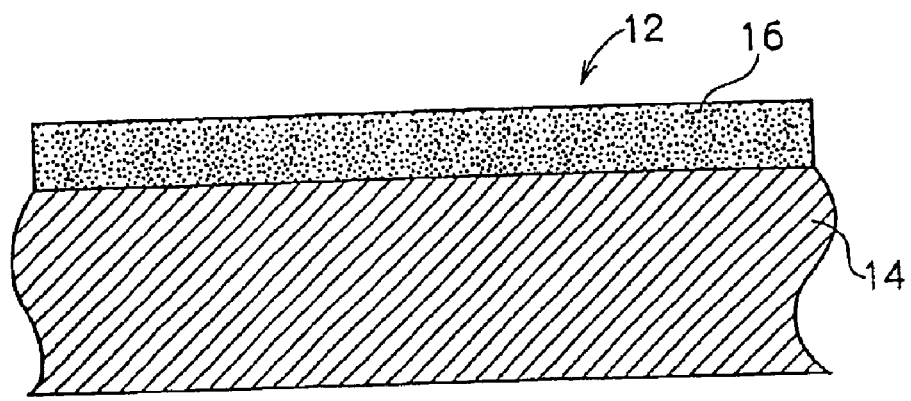
FIG. 2 is a schematic sectional view showing the structure of an X-ray film used as a web in the embodiment.

As shown in FIG. 2, the X-ray film 12 is a photographic photosensitive material. This photographic photosensitive material is structured by a base layer 14 formed as a support by using polyethylene terephthalate (PET), and an emulsion layer 16 formed on at least one surface of the base layer 14.

As shown in FIG. 1, the X-ray film 12 is wound in roll form on a core 18 of the web roll of the X-ray film 12, such that the emulsion layer 16 is directed inward. The core 18 is then set on a pedestal 20 such that the core 18 is pivotally supported. The X-ray film 12 is pulled out, from the outermost layer and beneath the core 18, from the web roll which is set on the pedestal 20.

Path rollers 22, 24 are provided next to the pedestal 20 in the web processing device 10, such that the path roller 24 is higher than the path roller 22. The X-ray film 12, which has been pulled out from the outermost layer of the web roll, is trained around the path roller 22 and directed upward. Due to the X-ray film 12 being trained around the path roller 24, the X-ray film 12 is directed substantially horizontally.

A pair of small rollers 26, 28 are disposed at the conveying direction downstream side (i.e., in the direction of the arrow in FIG. 1) of the path roller 24. A main feed roller 30 is disposed between the small rollers 26, 28. In this way, a substantially U-shaped conveying path is formed between the small rollers 26, 28. Between the small rollers 26, 28, the X-ray film 12 is trained around the main feed roller 30.

A plurality of holes (not shown) are formed in the outer peripheral surface of the main feed roller 30. The roller 30 is a suction roller which sucks and holds the X-ray film 12 which is trained around the outer peripheral surface thereof, due to a vacuum supplied from an unillustrated vacuum source. Further, the main feed roller 30 is driven to rotate by driving force of an unillustrated driving means.

The X-ray film 12 is trained around the main feed roller 30, and then conveyed at a moving speed (linear speed) corresponding to the rotational speed of the main feed roller 30.

Small rollers 34, 36 are disposed at the downstream side, in the conveying direction of the X-ray film 12, of the small roller 28. A sub feed roller 38 and a back-up roller 40 are disposed as a pair, higher than the small roller 36. The X-ray film 12 which has been fed out from the main feed roller 30 is conveyed substantially horizontally between the small rollers 34, 36. Then, the X-ray film 12 is fed out substantially vertically from the small roller 36 and trained around the sub feed roller 38.

The sub feed roller 38 is rotated by driving force of a drive source (unillustrated). The X-ray film 12 is nipped between the sub feed roller 38 and the back-up roller 40, and is fed-out substantially horizontally.

Disc-shaped slitting blades 52, 54 serving as a cutting device are disposed one above the other as a pair between the small rollers 34, 36. The slitting blades 52, 54 oppose a predetermined position of the X-ray film 12 in the transverse direction which is orthogonal to the conveying direction, and nip the X-ray film 12 which is passing through between the small rollers 34, 36. The slitting blades 52, 54 are driven to rotate by the driving force of an unillustrated drive source. In this way, a slit-shaped cut is formed along the conveying direction in the X-ray film 12 which is being conveyed substantially horizontally between the small rollers 34, 36.

Note that, in the present embodiment, as an example, the X-ray film 12 is cut into two X-ray films 12 by the pair of slitting blades 52, 54. However, the present invention is of course not limited to the same. The X-ray film 12 may be cut into a plurality of X-ray films 12 by using plural pairs of slitting blades 52, 54.

Path rollers 42, 44 and an inverting roller 46 are disposed at the downstream side of the sub feed roller 38. Each of the X-ray films 12 fed out from the sub feed roller 38 is directed upwardly by being trained around the path roller 42. Then, the X-ray films 12 are trained about the path roller 44, and are directed substantially horizontally toward the inverting roller 46.

Cores 48, 50 on which the X-ray films 12 are wound up are disposed beneath the inverting roller 46. The X-ray films 12, which have been cut along the longitudinal direction by the slitting blades 52, 54, are taken up onto the cores 48, 50, respectively. In this way, at the web processing device 10, the X-ray films 12 which have been cut into small widths are wound up in roll forms on the core 48 and the core 50. Note that the X-ray films 12 are wound onto the cores 48, 50 with their photosensitive surfaces 16 facing inwardly.

A wind-up control section 64 is provided at the web processing device 10. Drive sources (unillustrated), which drive the main feed roller 30, the sub feed roller 38, the wind-up shafts 48, 50, and the slitting blades 52, 54, are connected to the wind-up control section 64. The wind-up control section 64 cuts the X-ray film 12 into small widths, and winds the cut X-ray films 12 in roll forms onto the cores 48, 50. In order to wind-up the X-ray films 12 in this way, due to the main feed roller 30, the sub feed roller 38, and the cores 48, 50 being driven to rotate, the X-ray film 12 is conveyed while being pulled out from the core 18, and the slitting blades 52, 54 are driven to rotate.

A web tension pick-up member 70 is provided at each of the path roller 24, the small roller 36, and the path roller 44 in the web processing device 10. The wind-up control section 64 conveys the X-ray films 12 without causing slack to arise thereat, and uniformly winds the X-ray films 12 up on the cores 48, 50. In order to wind-up the X-ray films 12 in this way, the main feed roller 30, the sub feed roller 38, and the cores 48, 50 are driven to rotate such that the tension of the X-ray films 12 becomes a predetermined target value due to these web tension pick-up members 70.

A web edge control sensor 72 is provided at the web processing device 10 between the path rollers 22, 24. The web edge control sensor 72 detects the transverse direction position of the X-ray film 12 which is being conveyed, such that the transverse direction position of the pedestal 20, which rotatably supports the core 18, is controlled. In this way, transverse direction positional offset of the X-ray film 12 is prevented.

At the web processing device 10, the X-ray film 12 is decelerated and stopped in the following manner. The rotation of the core 18 is detected by an unillustrated sensor. The wound diameter is computed from the moving speed of the X-ray film 12 (the rotational speed of the main feed roller 30) and the rotational speed of the core 18. When the computed value becomes the same as the outer diameter of the core 18, it is judged that there is no more X-ray film 12 wound on the core 18. The wind-up control section 64 decelerates and stops the X-ray film 12 at a time which is set in advance. The time which is set in advance can be, for example, the time when the trailing ends of the X-ray films 12 reach a vicinity of the winding cores 48, 50, or the time when predetermined amounts of the X-ray films 12 have been wound up on the cores 48, 50.

In this way, at the web processing device 10, it is possible to continuously process the X-ray films 12 of plural web rolls. In addition, it is possible to wind-up predetermined amounts of the X-ray films 12 on the respective cores 48, 50.

A marking mechanism 80 is provided at the web processing device 10. The marking mechanism 80 has a print roller 32 and a marking head 56.

The print roller 32 is disposed between the small rollers 28, 34 at the upstream side of the slitting blades 52, 54. The X-ray film 12, which has been fed out at a constant linear speed from the main feed roller 30, is trained around the print roller 32 before being cut by the slitting blades 52, 54.

The marking head 56 is disposed so as to oppose the X-ray film 12 which is trained about the print roller 32. The marking head 56 has a laser oscillator 58 and a beam deflector 60. The head 56 irradiates a laser beam LB onto the X-ray film 12 which is trained on the print roller 32.

A laser control section 62, which controls the operation of the marking head 56, and a marking control section 66, which controls the timing of operating the marking head 56, are provided at the web processing device 10. A rotary encoder (RE) 74, which outputs a pulse signal corresponding to the angle of rotation of the print roller 32, is provided at the print roller 32. The rotary encoder 74 is connected to the marking control section 66.

The marking control section 66 outputs a write signal to the laser control section 62 as follows. The marking control section 66 measures the amount of movement of the X-ray film 12 from the pulse signal inputted from the rotary encoder 74. The marking control section 66 outputs a write signal each time the amount of movement of the X-ray film 12 reaches a predetermined amount which is set in advance.

Due to a write instruction (write signal) being inputted from the marking control section 66, the laser control section 62 drives the marking head 56, such that formation of predetermined marking patterns MP (see FIG. 3 and FIG. 4) on the X-ray film 12 is carried out.

In this way, at the web processing device 10, the marking patterns MP are formed on the X-ray film 12 at each predetermined interval along the conveying direction.

The laser oscillator 58 which is applied to the present embodiment is a $CO_2$ laser. On the basis of an inputted drive signal, the laser beam LB of a given wavelength is irradiated for a predetermined time width (pulse width).

An acoustooptic deflector (AOD) is used as the beam deflector 60. Due to a deflection signal of an ultrasonic frequency being inputted to the AOD, the AOD, on the basis of this deflection signal, deflects the laser beam LB which is irradiated from the laser oscillator 58. In this way, by successively switching the deflection signal (the ultrasonic frequency), the laser beam LB which is emitted from the laser oscillator 58 is scanned while being deflected along the transverse direction of the X-ray film 12, and is irradiated onto the X-ray film 12.

Namely, at the web processing device 10, the laser beam LB is irradiated with the direction of movement of the X-ray film 12 being the main scanning direction and the transverse direction of the X-ray film 12 being the subscanning direction.

The laser beam LB is focussed, by an unillustrated optical system such as a condensing lens or the like, so as to connect focal points having predetermined spot diameters on the X-ray film 12.

The marking pattern MP can be imagined as being an m by n matrix in which the main scanning direction and the subscanning direction are divided into m parts and n parts. A mark, such as a character or a symbol, is formed by the presence or absence of a dot at each divisional position.

When a series of characters or symbols is to be printed repeatedly at a constant interval, while printing the series of characters or symbols, the laser control section 62 continuously makes the laser oscillator 58 oscillate and emit the laser beam LB. When printing of the series of characters or symbols has been completed, the laser control section 62 stops the oscillation of the laser oscillator 58 during this time of non-printing until the next printing starts.

The frequency of the deflection signal supplied to the AOD (the laser deflector 60) is switched in accordance with the divisional position along the subscanning direction. Further, the deflection signal is turned on and off in accordance with the mark (the dot pattern) of the character or the symbol or the like to be printed.

At this time, for blank sections of the matrix where there is no need to form a dot, a blank portion is formed by not inputting a deflection signal (turning the deflection signal off) even at the time when the deflection signal is inputted to the AOD. In this way, the laser beam LB advances straight forward without being deflected, and hits and is absorbed by an unillustrated light absorbing material.

Further, by turning the deflection signal on (making the deflection signal be in a pulse form) and inputting the deflection signal at the time when a dot is to be formed, the laser beam LB is deflected. In this way, the beam LB becomes a pulse form and is irradiated onto the X-ray film 12 and focussed in the form of a dot (the form of a spot) on the X-ray film 12.

A pattern signal, which corresponds to a marking pattern such as characters or symbols or the like which are to be recorded on the X-ray film 12, is inputted to the laser control section 62. On the basis of this pattern signal, the laser control section 62 drives the marking head 56 (the laser oscillator 58 and the beam deflector 60). Note that the pattern signal may be inputted at a predetermined time from the wind-up control section 64 or the marking control section 66. Further, the pattern signal may be stored in advance in the laser control section 62.

Figure 3:
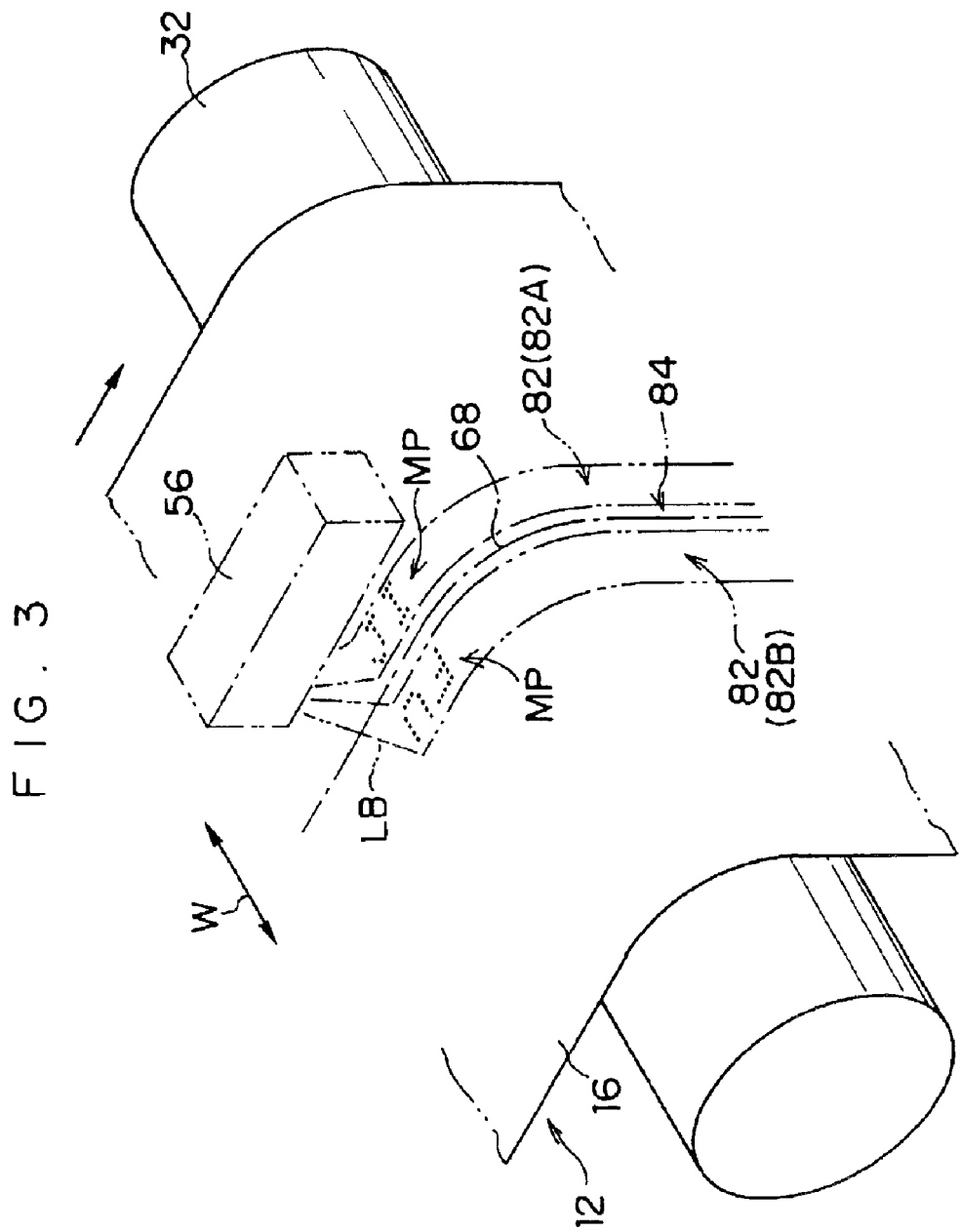
FIG. 3 is a schematic perspective view showing irradiation of a laser beam onto an X-ray film from a marking head.
Figure 4:
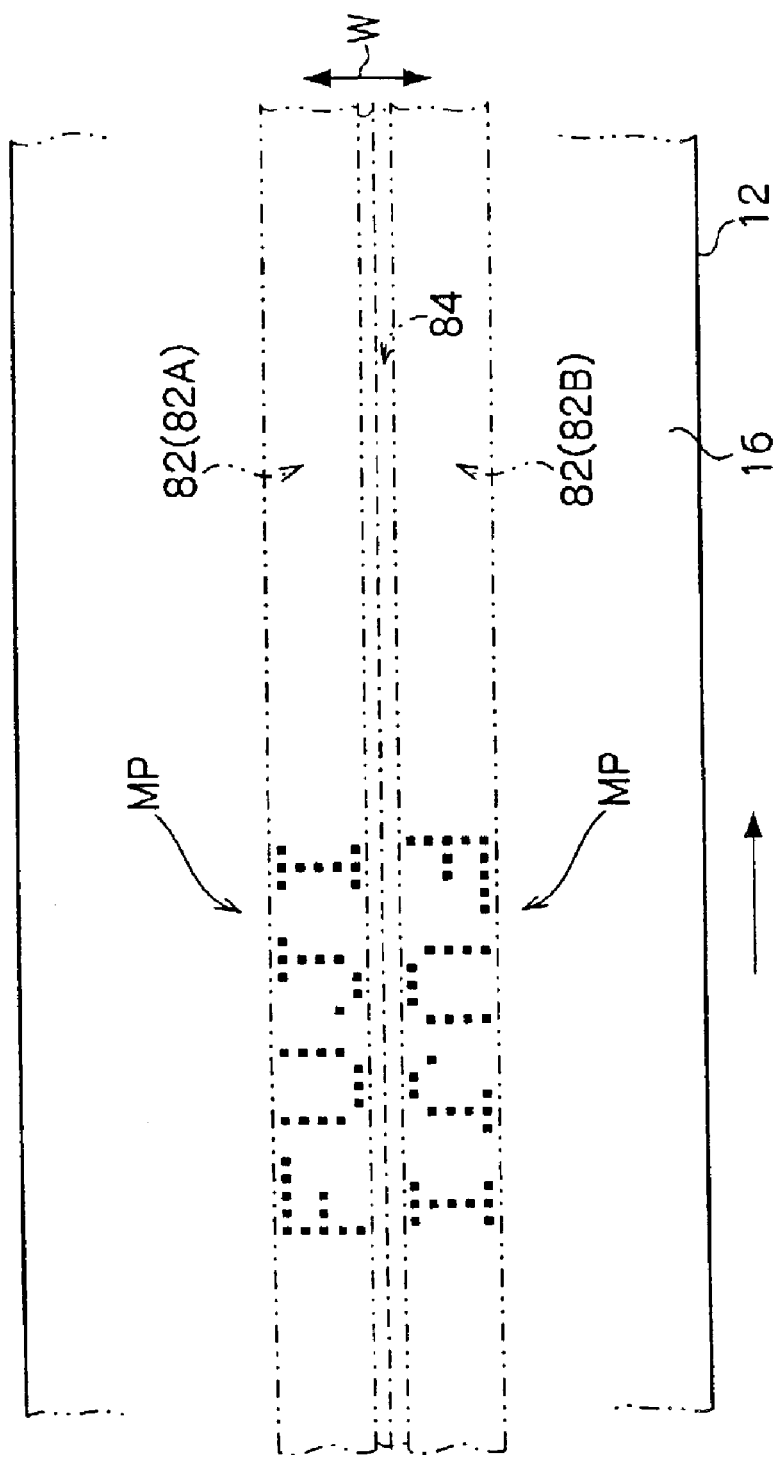
FIG. 4 is a schematic diagram of an X-ray film on which marking patterns have been formed.

The emulsion layer 16 of the X-ray film 12 is melted due to the laser beam LB being irradiated. Then, a projection-shaped dot is formed at the emulsion layer 16. In this way, for example, as shown in FIGS. 3 and 4, a predetermined marking pattern MP is formed by a dot pattern on the X-ray film 12. Note that, in FIGS. 3 and 4, a plurality of letters of the alphabet are formed by 5 by 5 dots as one example of the marking pattern MP.

Due to the laser beam LB being irradiated, the emulsion layer 16 of the X-ray film 12 is melted by the thermal energy of the laser beam LB. At this time, during the process of melting, a plurality of minute air bubbles are formed at the swollen interior of the dot at the emulsion layer 16.

Due to a plurality of minute air bubbles being formed at the emulsion layer 16, a large number of boundary films between the air bubbles are formed at the X-ray film 12, which promotes the irregular reflection of light. In this way, in the present embodiment, due to the reflected light amounts at the interior and the exterior of the dot greatly differing, the dot can be made visible regardless of whether the X-ray film 12 has or has not been developed or regardless of the lightness/darkness of the density, and the visibility of the dot improves. Note that, in the present embodiment, the amount of projection of the dot formed at the emulsion layer 16 by the laser beam LB is 10 $\mu$m or less, and the size (diameter) of each air bubble is 1 to 5 $\mu$m.

The time over which the laser beam LB is irradiated in order to form the dot (the irradiation time for forming one dot) is in a range of 1 $\mu$sec to 15 $\mu$sec when the oscillation wavelength of the laser oscillator 58 (i.e., the wavelength of the laser beam LB) is in the band of 9 $\mu$m (e.g., wavelengths of 9.3 $\mu$m or 9.6 $\mu$m). When the oscillation wavelength of the laser oscillator 58 is in the 10 $\mu$m band (e.g., 10.6 $\mu$m), by making the irradiation time of the laser beam LB be 5 $\mu$sec to 18 $\mu$sec, a dot such as that described above can be formed. In the present embodiment, from the standpoint of work efficiency, the laser oscillator 58 which oscillates the laser beam LB of a 9 $\mu$m band wavelength is used.

It is possible to further control the irradiation time of the laser beam LB such that no space can be formed at the boundary surface between the base layer 14 and the emulsion layer 16 of the X-ray film 12. This space is different from the air bubbles which are generated within the emulsion layer 16 at the time of forming the dots. When a space is formed between the base layer 14 and the emulsion layer 16, at the point in time when the laser beam LB is irradiated and the dot is formed, the visibility of the dot increases. By subjecting the X-ray film 12 to developing processing, the emulsion layer 16 above this space scatters and opens. Thus, a state which is equivalent to that at the time of forming a dot by exceeding the aforementioned irradiation time (15 $\mu$sec at a 9 $\mu$m band, 18 $\mu$sec at a 10 $\mu$m band) arises.

Namely, in order for no space to form between the base layer 14 and the emulsion layer 16 of the X-ray film 12, the irradiation time of the laser beam LB is controlled to be in the narrow range of 1 $\mu$sec to 10 $\mu$sec at an oscillation wavelength of the 9 $\mu$m band, and 5 $\mu$sec to 8 $\mu$sec at an oscillation wavelength of the 10 $\mu$m band. As a result, it is possible to reduce the difference between the evaluation of the visibility at the stage of manufacturing the X-ray film 12, and the evaluation of the visibility by the user.

The beam deflector 60 is provided at the laser control section 62 of the marking mechanism 80 provided at the web processing device 10. The beam deflector 60 deflects the laser beam LB such that the laser beam LB is irradiated within a predetermined range along the transverse direction of the X-ray film 12 (the direction of arrow W).

At this time, the laser control section 62 uses both sides of the scanning direction of the laser beam LB (the direction of arrow W in FIG. 3 and FIG. 4) as printing regions 82 (printing regions 82A, 82B), and uses the region between the printing regions 82A, 82B as a non-printing region 84. The marking mechanism 80 forms the marking patterns MP within the printing regions 82.

At the laser control section 62, the deflection signal (ultrasonic frequency) is turned off, for example, at the time when the laser beam LB irradiated from the laser oscillator 58 is deflected into the non-printing region 84. At the time when the laser beam LB is deflected into the printing regions 82A, 82B, the deflection signal is turned on and off on the basis of the pattern signal.

In this way, the marking mechanism 80 forms the marking pattern MP in each of the printing regions 82A, 82B which are provided at both sides, in the transverse direction of the X-ray film 12, of the non-printing region 84.

Namely, the marking mechanism 80 divides the irradiated region of the laser beam LB irradiated from the marking head 56 into three sections along the transverse direction of the X-ray film 12, and makes the central section be the non-printing region 84. The width of the non-printing region 84 along the transverse direction of the X-ray film 12 can be set on the basis of various conditions. Such conditions include the positional accuracy of the marking head 56, the conveying accuracy of the X-ray film 12, the positional accuracy at the time of cutting by the slitting blades 52, 54, and the minimum distance between the marking pattern MP and the transverse direction end portion of the X-ray film 12 which is formed to be a small width.

Further, in the present embodiment, a pattern signal which forms the marking pattern MP at one of the printing regions 82A, 82B is stored. When the marking pattern MP is to be formed at the other of the printing regions 82A, 82B, the pattern signal is transformed such that the marking pattern MP formed at the one of the printing regions 82A, 82B is rotated by 180°. Note that the setting of the marking pattern MP can be carried out by using an arbitrary setting method such as an operator carrying out key input or the like.

Figure 5:
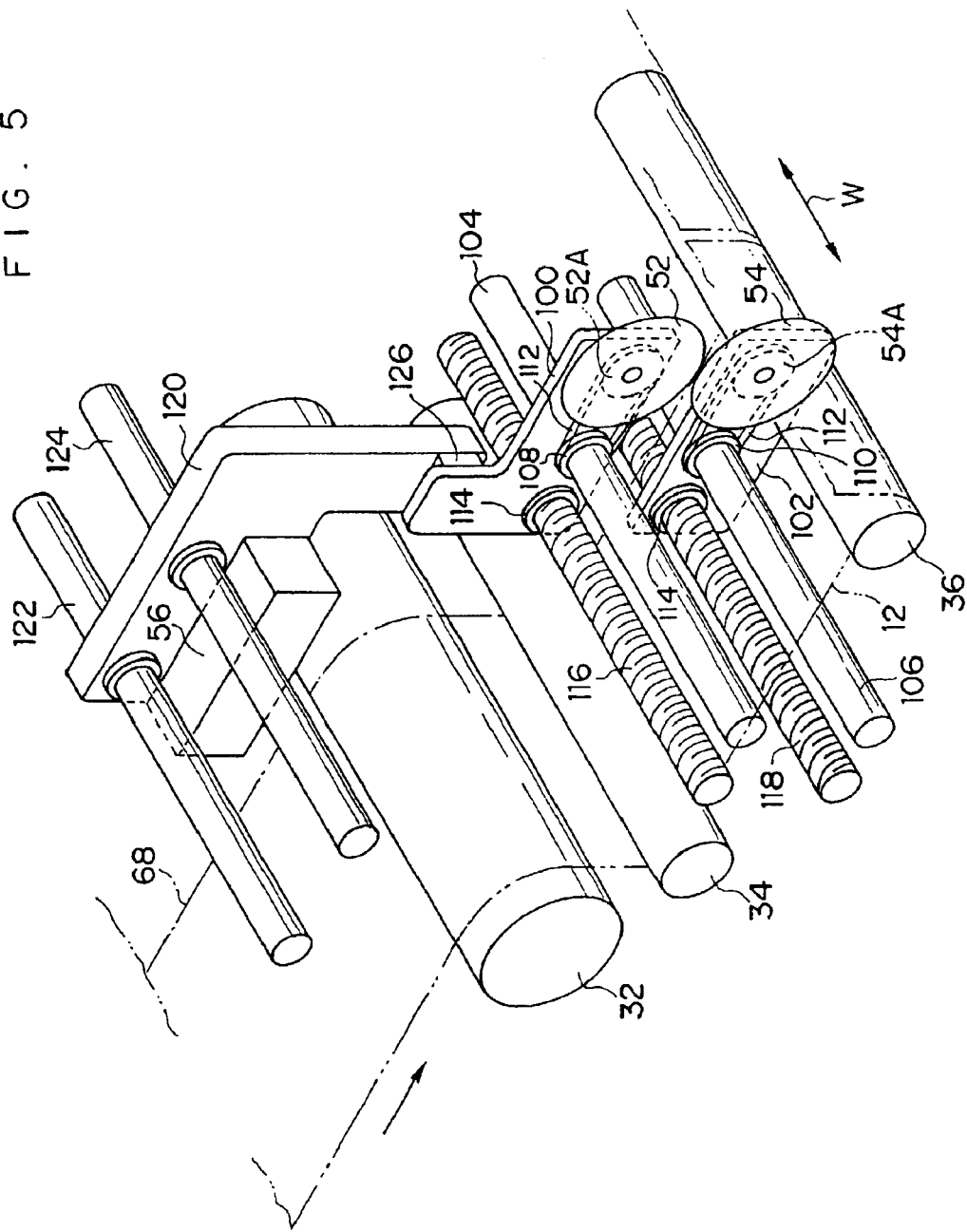
FIG. 5 is a perspective view of main portions showing the schematic structure of a moving mechanism of slitting blades and the marking head.

As shown in FIG. 5, a pair of upper and lower base plates 100, 102 are provided between the small rollers 34, 36, such that the conveying path of the X-ray film 12 is disposed between the base plates 100, 102. The slitting blade 52 is rotatably mounted to the base plate 100. The slitting blade 54, which opposes the slitting blade 52, is rotatably mounted to the base plate 102.

Drive shafts 104, 106 are inserted through the base plates 100, 102, respectively. The drive shafts 104, 106 are disposed such that the axial directions thereof run along the transverse direction of the X-ray film 12, and are mounted so as to rotate freely with respect to the base plates 100, 102, and can move along their axial directions relatively with respect to the base plates 100, 102.

A pulley 108 is mounted to the drive shaft 104. A pulley 110 is mounted to the drive shaft 106. The pulleys 108, 110 can move relatively with respect to the drive shafts 104, 106, integrally with the base plates 100, 102. Further, the pulleys 108, 110 can rotate integrally with the drive shafts 104, 106.

A pulley 52A is provided at the slitting blade 52. A pulley 54A is provided at the slitting blade 54. Endless driving belts 112 are trained between the pulley 52A and the pulley 108, and between the pulley 54A and the pulley 110, respectively. In this way, the drive shaft 104 and the slitting blade 52 rotate integrally, and the drive shaft 106 and the slitting blade 54 rotate integrally.

Note that the slitting blades 52, 54 may be connected to and able to rotate integrally with the drive shafts 104, 106, without using the pulleys 108, 110 and the driving belts 112. Further, a conventional, known, general structure (e.g., a structure using key grooves) can be applied to the mounting of the drive shafts 104, 106 and the pulleys 108, 100 to the base plates 100, 102. Thus, in the present embodiment, detailed description thereof will be omitted.

The drive shafts 104, 106 are connected to an unillustrated drive source whose operation is controlled by the wind-up control section 64. The drive shafts 104, 106 are driven to rotate by the driving force of this drive source.

A feed nut 114 is mounted as a moving device to each of the base plates 100, 102. Screws 116, 118 are screwed together with the feed nuts 114 so as to pass through the base plates 100, 102. The feed screws 116, 118 are disposed parallel to the drive shafts 104, 106.

Each of the feed screws 116, 118 is connected to an unillustrated size changing motor. The feed screws 116, 118 are rotated integrally by the driving force of the size changing motor. The base plates 100, 102 are supported so as to be movable along the transverse direction of the X-ray film 12, by the feed screws 116, 118 and the drive shafts 104, 106. Due to the feed screws 116, 118 rotating, the base plates 100, 102 move parallel and integrally along the transverse direction of the X-ray film 12.

In this way, at the web processing device 10, due to the movement of the base plates 100, 102, the slitting blades 52, 54 are moved along the transverse direction of the X-ray film 12, and the X-ray film 12 can be cut to an arbitrary width. Note that, at the web processing device 10, the respective X-ray films 12 which have been cut by the slitting blades 52, 54 are separated from one another. In this way, it is possible to prevent the two X-ray films 12 cut by the slitting blades 52, 54 from becoming superposed one on the other at the downstream side.

As shown in FIGS. 1 and 5, the marking head 56 is provided in a vicinity of the slitting blade 52. As shown in FIG. 5, the marking head 56 is mounted to a bracket 120. A pair of guide shafts 122, 124 are inserted through the bracket 120.

The guide shafts 122, 124 are disposed parallel to the drive shaft 104 and the feed screw 116. In this way, the marking head 56 can move together with the bracket 120 along the transverse direction of the X-ray film 12.

Moreover, the bottom end portion of the bracket 120, which is bent into a substantial L shape, is connected to the base plate 100 by a connecting member 126. The bracket 120 and the marking head 56 thereby move integrally with the base plate 100 along the transverse direction of the X-ray film 12.

The non-printing region 84, which is not printed by the laser beam LB irradiated from the marking head 56, exists at the X-ray film 12. The bracket 120 is connected to the base plate 100 such that the non-printing region 84 opposes the position where the X-ray film 12 is cut by the slitting blades 52, 54.

In this way, the marking patterns MP, one of which is upside down as compared with the other, are formed at both sides of the position (a cutting line 68 shown in FIGS. 3 and 4) at which the X-ray film 12 is cut by the slitting blades 52, 54. The marking patterns MP are formed at transverse direction one end sides of the X-ray films 12 wound-up on the cores 48, 50, such that the marking patterns MP are oriented the same when viewed from said sides.

Operation of the present embodiment will be described hereinafter.

At the webbing processing device 10, the main feed roller 30, the sub feed roller 38, and the cores 48, 50 are driven to rotate in a state in which the web roll of the X-ray film 12 is set on the pedestal 20. Then, the X-ray film 12 is pulled out from the web roll. While being pulled out, the X-ray film 12 is conveyed toward the cores 48, 50.

Further, at the web processing device 10, the slitting blades 52, 54 are driven to rotate, and cut the X-ray film 12 at the intermediate portion in the transverse direction thereof. Due to this cutting, the X-ray film 12 is divided into X-ray films 12 of widths which are smaller than the web roll. The divisional X-ray films 12 are wound up onto the cores 48, 50, respectively.

The marking mechanism 80 is provided at the web processing device 10 at the upstream side of the slitting blades 52, 54. Before the X-ray film 12 is cut by the slitting blades 52, 54, the marking patterns MP are formed at predetermined positions of the X-ray film 12.

Namely, at the web processing device 10, both cutting processing and marking processing of the X-ray film are carried out. At this time, at the web processing device 10, the X-ray film 12 is subjected to the marking processing before the width of the X-ray film 12 is reduced.

When the web such as the X-ray film 12 is conveyed along the longitudinal direction thereof while being trained about plural rollers, if the width of the X-ray film 12 is small, it is easy for skewed conveying and lateral offset and the like to arise. Further, when the X-ray film 12 is cut along the longitudinal direction thereof while it is being conveyed and the cut X-ray films 12 are conveyed in parallel, the adjacent X-ray films 12 may become superposed on one another due to lateral offset.

A case can be considered in which an attempt is made to form the marking patterns MP on the X-ray films 12 which have been cut by the slitting blades 52, 54. Here, the positions of the marking patterns MP are offset in the transverse direction of the X-ray films 12. Thus, it is difficult to form the marking patterns MP at constant positions with respect to the transverse direction. Moreover, there is the concern that a portion of the marking pattern MP will be omitted.

Thus, in the web processing device 10, the print roller 32 and the marking head 56 are provided at the upstream side of the slitting blades 52, 54. As a result, the marking processing is carried out before the X-ray film 12 is cut by the slitting blades 52, 54. Accordingly, appropriate marking patterns MP can be formed at predetermined positions of the X-ray film 12.

In particular, at the web processing device 10, the marking head 56 is disposed so as to form the marking patterns MP immediately before the X-ray film 12 is cut by the slitting blades 52, 54. Accordingly, the error of the positions of the marking patterns MP with respect to the position of cutting by the slitting blades 52, 54 can be kept to a minimum.

The marking mechanism 80 provided at the web processing device 10 forms the marking patterns MP each time the conveyed amount of the X-ray film 12 reaches a predetermined amount. At this time, the laser beam LB oscillated by the laser oscillator 58 is deflected by the laser deflector 60 which uses an AOD. In this way, the marking head 56 scans the laser beam LB along the transverse direction of the X-ray film 12.

The marking mechanism 80 forms the non-printing region 84 between the printing regions 82 (82A, 82B). The marking pattern MP is formed in each of the printing regions 82A, 82B. At the web processing device 10, the non-printing region 84 which is not printed by the marking mechanism 80 opposes the slitting blades 52, 54.

In this way, at the web processing device 10, the marking pattern MP can be formed at each of the two X-ray films 12 by the one marking head 56.

Namely, the position opposing the slitting blades 52, 54 lies within the non-printing region 84. The marking pattern MP is formed in each of the printing regions 82A, 82B which are regions which sandwich the non-printing region 84. In accordance with this method, the marking pattern MP can be formed by the one marking head 56 on each of the two X-ray films 12 which are processed into small widths, at a predetermined position of one transverse direction end side of each X-ray film 12.

Accordingly, a small space suffices for placement of the marking head 56 for forming the marking pattern MP on each of the small-width X-ray films 12. Therefore, the web processing device 10 does not become large.

In the present embodiment, as an example, the marking pattern MP is formed on each of the two divisional X-ray films 12. However, other cases such as the following can be envisaged. When the X-ray film 12 is to be divided into 2n divisional films where n is a positive number of 1 or more, it suffices to provide n marking heads 56. When the X-ray film 12 is to be divided into 2n+1 divisional films, it suffices to provide n+1 marking heads 56.

In the present embodiment, the marking patterns MP are formed simultaneously in the printing regions 82A, 82B. However, the present invention is not limited to the same. As shown in FIG. 6 for example, the marking patterns MP can be formed alternately at predetermined intervals in the printing regions 82A, 82B. Namely, the marking patterns MP can be formed at arbitrary times in the printing regions 82A, 82B.

In this case, for example, when the marking pattern MP is to be formed in the printing region 82A, it suffices to deflect the laser beam LB to be scanned within the printing region 82A. When the marking pattern MP is to be formed in the printing region 82B, it suffices to deflect the laser beam LB to be scanned within the printing region 82B.

By structuring the web processing device 10 in this way, the scanning width of the laser beam LB is narrowed. Namely, the scanning time can be shortened. Accordingly, it is possible to quickly form the marking patterns MP on the X-ray film 12. Moreover, it is possible to prevent problems, such as the linear speed of the X-ray film 12 decreasing or the like, from arising in order to form the marking patterns MP.

The scanning of the laser beam LB can be carried out simply and in a short time (instantaneously) merely by electrical control such as switching the deflection signal.

There are cases in which the cut width of the X-ray film 12 is to be changed, such as when the lot switches or the like. At the web processing device 10, by driving the drive shafts 104, 106 to rotate by the unillustrated size changing motor, the slitting blades 52, 54 can be moved along the transverse direction of the X-ray film 12.

In this way, at the web processing device 10, the slitting blades 52, 54 can be made to oppose an arbitrary position along the transverse direction of the X-ray film 12, and can carry out cutting of the X-ray film 12. Namely, at the web processing device 10, the width at the time of cutting the X-ray film 12, which has been pulled-out from the web roll, to a small width can be set arbitrarily.

Moreover, in the web processing device 10, the marking head 56 is fixed to the base plate 100 to which the slitting blade 52 is mounted. As the slitting blade 52 moves, the marking head 56 also moves integrally along the transverse direction of the X-ray film 12.

Due to the marking head 56 moving integrally with the slitting blade 52 along the transverse direction of the X-ray film 12, the non-printing region 84 always opposes the position of the X-ray film 12 cut by the slitting blades 52, 54, i.e., the cutting line 68.

In this way, at the web processing device 10, the marking patterns MP can be formed at the transverse direction end portions of the X-ray films 12 cut by the slitting blades 52, 54.

Namely, at the web processing device 10, the slitting blade 52 is moved integrally with the marking head 56.

Therefore, regardless of the width of the X-ray film 12, the printing region 82 opposes the transverse direction end portion of the X-ray film 12, and the marking pattern MP can be formed accurately at the transverse direction end portion of the X-ray film 12.

Note that, although the disc-shaped slitting blades 52, 54 are used in the present embodiment, the slitting blade 54 which is the lower blade may be formed to be cylindrical. In this way, if only the slitting blade 52 which is the upper blade is moved, the cutting position of the X-ray film 12 can be changed. Thus, the structure of the moving device can be simplified.

Further, in the present embodiment, the block-shaped connecting member 126 is used as the connecting device. However, the present invention is not limited to the same, and the base plate 100 and the bracket 120 may be connected by, for example, a screw, such that the distance therebewteen can be adjusted. In this way, even if the marking head 56 is attachable/removable, if adjustment of the mounting position of the marking head 56 with respect to the X-ray film 12 by the slitting blades 52, 54 is possible, adjustment of the non-printing region 84 with respect to the slitting blades 52, 54 can be carried out accurately even after maintenance of the marking head 56 has been carried out.

The connecting device may be any arbitrary configuration or structure, provided that the base plate 100 and the bracket 120 can move integrally along the transverse direction of the X-ray film 12.

In this way, in the web processing device 10 applied to the present embodiment, when the X-ray film 12 is to be cut to a predetermined width, the cutting is carried out together with the processing of marking the X-ray film 12. In this way, the work efficiency from the cutting of the X-ray film 12 to the marking processing can be improved. In addition, the marking patterns MP can be formed at appropriate positions of the cut X-ray films 12.

Further, at the web processing device 10, the marking patterns MP are formed on the two X-ray films 12 by the one marking head 56. Thus, the number of marking heads 56 which form the marking patterns MP on the X-ray films 12 which have been processed to small widths can be made to be small, and the device does not become large.

The above-described embodiment is not intended to limit the structure of the present invention. For example, in the present embodiment, the same marking pattern MP was formed in the printing regions 82A, 82B, with one of the marking patterns MP being upside-down with respect to the other. However, the present invention is not limited to the same, and different marking patterns MP may be formed in the printing regions 82A, 82B.

Moreover, in the present embodiment, the X-ray film 12, which is one type of photographic photosensitive material, was used as an example of the web on which the marking pattern is formed. The present invention was described by using the marking mechanism 80 which forms the marking patterns MP on the X-ray film 12 while the X-ray film 12 is cut in two. However, the present invention is not limited to the X-ray film 12, and can be applied to the marking of any arbitrary photographic photosensitive material. Further, the present invention is not limited to photographic photosensitive materials, and can be applied to arbitrary processing devices which carry out processing while conveying an arbitrary web.

As described above, in accordance with the web processing method of the present invention, it is possible to improve the work efficiency at the time of obtaining webs which are cut to small widths and on which characters, symbols, or the like are marked. Moreover, in the web processing method of the present invention, the marking regions are provided at the both sides, along the transverse direction of the web, of the non-marking region which is not marked by the marking mechanism. In addition, the non-marking region opposes the web cutting position which is cut by the cutting device. In accordance with this structure, there is the excellent effect that marking processing can be carried out accurately on respective cut webs without leading to an increase in the size of the device.

Moreover, in accordance with the web processing device of the present invention, when a web is ready to be cut to arbitrary widths, characters and symbols can be formed accurately on the web.

What is claimed is:

1. A web processing method comprising:

conveying a web along a longitudinal direction of the web in a state in which the web is trained around a plurality of rollers;

marking at least one of characters and symbols on the web by irradiating a laser beam while scanning the laser beam; and after said marking, cutting the web at a position along a transverse direction of the web such that the cut is made along a conveying direction of the web, while carrying out said conveying of the web;

wherein a marking head for marking said web is provided in a vicinity of a cutting device for cutting said web;

wherein said marking head and cutting device are connected.

2. The web processing method of claim 1, further comprising forming a predetermined marking pattern on the web, by using a predetermined position along the transverse direction of the web as a non-marking region and by using regions at both transverse direction sides of the non-marking region as marking regions, and such that the non-marking region becomes a cutting position of the web.

3. The web processing method of claim 1, wherein said marking includes forming a marking pattern on the web by deflecting with an acousto-optic deflector, along the transverse direction of the web, the laser beam which is emitted in accordance with the marking pattern.

4. A web processing device which, after carrying out marking processing on a web while conveying the web, carries out cutting processing on the web, said device comprising:

a conveying device conveying the web along a longitudinal direction of the web while training the web around a plurality of rollers;

a cutting device cutting the web by slitting blades disposed so as to oppose a predetermined position of the web in a transverse direction of the web which is being conveyed by the conveying device;

a marking mechanism forming one of characters and symbols on the web by a laser beam emitted from a marking head at an upstream side, in a conveying direction of the web, of the slitting blades of the cutting device;

a base portion at which the slitting blades are provided;

a moving device moving the base portion along the transverse direction of the web;

a supporting device supporting the marking head such that the marking head is movable along the transverse direction of the web; and a connecting device connecting the marking head, which is supported by the supporting device, to the base portion, and enabling the marking head to move integrally with the slitting blades along the transverse direction of the web.

5. The web processing device of claim 4, wherein the conveying device includes at last one path roller, a pair of small rollers, and a main feed roller disposed between the small rollers, and a U-shaped conveying path is formed by the small rollers and the main feed roller, and the web is trained about the main feed roller between the small rollers.

6. The web processing device of claim 5, wherein the main feed roller is a suction roller which sucks and holds the web by applying a vacuum to the web from at least one hole formed in an outer peripheral surface of the main feed roller.

7. The web processing device of claim 4, wherein two small rollers are disposed at a downstream side, in the conveying direction of the web, of the conveying device, and a sub feed roller and a back-up roller are disposed as a pair downstream of the two small rollers, and the slitting blades of the cutting device are disposed one above another between the two small rollers.

8. The web processing device of claim 6, wherein the slitting blades are disposed as a pair, with one slitting blade being disposed above another slitting blade.

9. The web processing device of claim 6, where a plurality of pairs of the slitting blades are provided.

10. The web processing device of claim 6, wherein the slitting blades are disc-shaped.

11. The web processing device of claim 6, wherein a lower slitting blade of the slitting blades is cylindrical.

12. The web processing device of claim 6, wherein the base portion includes a pair of base plates which are disposed, between the two small rollers, one above another with a conveying path of the web therebetween, and each of the slitting blades is rotatably mounted to a corresponding one of the base plates respectively.

13. The web processing device of claim 12, wherein the cutting device includes drive shafts which are rotatably inserted through the base plates respectively, and axial directions of the drive shafts are disposed along the transverse direction of the web.

14. The web processing device of claim 13, wherein a pulley is provided at each of the slitting blades, and other pulleys are provided at the drive shafts, and endless driving belts are trained around the pulleys and the other pulleys, and the drive shafts and the slitting blades can rotate integrally.

15. The web processing device of claim 13, wherein the moving device has feed nuts which are mounted to the base plates respectively, and feed screws, which are disposed parallel to the drive shafts, are screwed together with the feed nuts respectively.

16. The web processing device of claim 15, wherein the base plates are supported so as to be movable along the transverse direction of the web, by the feed screws and the drive shafts.

17. The web processing device of claim 15, wherein the marking mechanism further has a print roller disposed between small rollers upstream of the slitting blades, and the marking head is disposed so as to oppose the web which is trained around the print roller.

18. The web processing device of claim 17, further comprising a laser control section which controls operation of the marking head, and a marking control section which controls timing of the marking head, wherein the marking head has a laser oscillator and a beam deflector, and a rotary encoder outputting a pulse signal corresponding to an angle of rotation of the print roller is provided at the print roller, and the rotary encoder is connected to the marking control section, and the laser control section is connected such that a signal can be inputted to the laser control section from the marking control section.

19. The web processing device of claim 17, wherein the supporting device includes a bracket mounted to the marking head, and a pair of guide shafts are inserted through the bracket, and the guide shafts are disposed parallel to the drive shafts and the feed screws.

20. The web processing device of claim 19, wherein the bracket has an L-shaped lower end portion, and the connecting device has a block-shaped connecting member which connects the lower end portion of the bracket to the base plates.

21. The web processing device of claim 19, wherein the connecting device has screws which connect the bracket and the base plates such that a distance between the bracket and the base plates can be adjusted.

22. The web processing device of claim 7, wherein n is an integer, and n marking heads are provided when the web is to be divided into 2n webs.

23. The web processing device of claim 7, wherein n is an integer, and n-plus-1 marking heads are provided when the web is to be divided into 2n plus 1 webs.

24. The web processing device of claim 4, wherein the web is a photographic photosensitive material.

25. The web processing device of claim 24, wherein the web is an X-ray film.

* * * * *